No. 665,435. Patented Jan. 8, 1901.
A. HEINHOLD.
APPARATUS FOR PURIFYING SEWAGE.
(Application filed Apr. 17, 1899.)
(No Model.) 3 Sheets—Sheet 1.
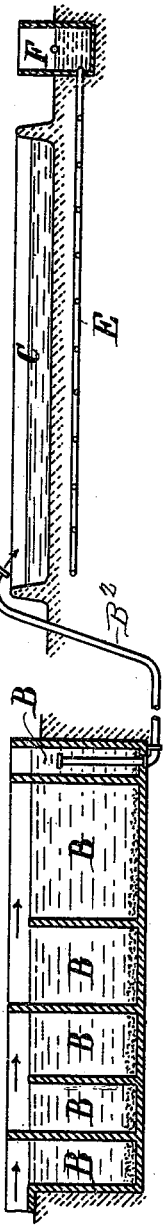
Fig. 1. Section NN (Fig. 2.)
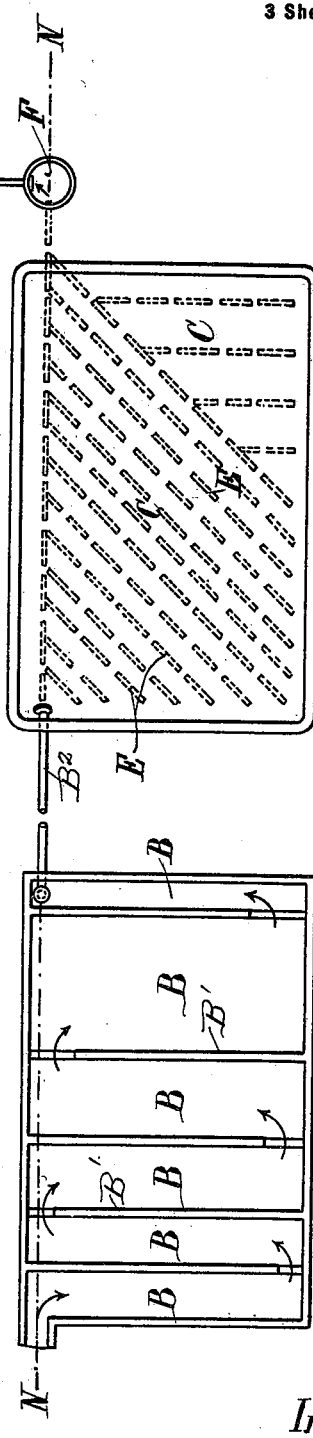
Fig. 2.
Witnesses:
Alfred Meister
Walter Jesse
Inventor:
August Heinhold
by Eustace H. Hopkins
Att'y.

No. 665,435. Patented Jan. 8, 1901.
A. HEINHOLD.
APPARATUS FOR PURIFYING SEWAGE.
(Application filed Apr. 17, 1899.)
(No Model.) 3 Sheets—Sheet 2.
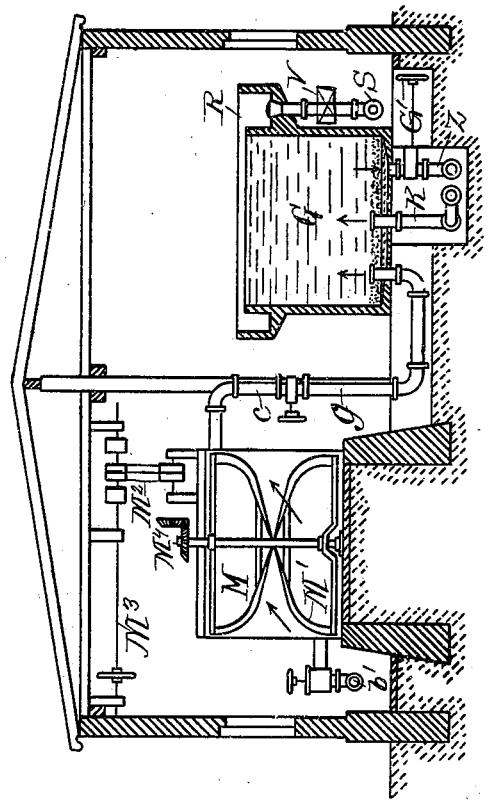
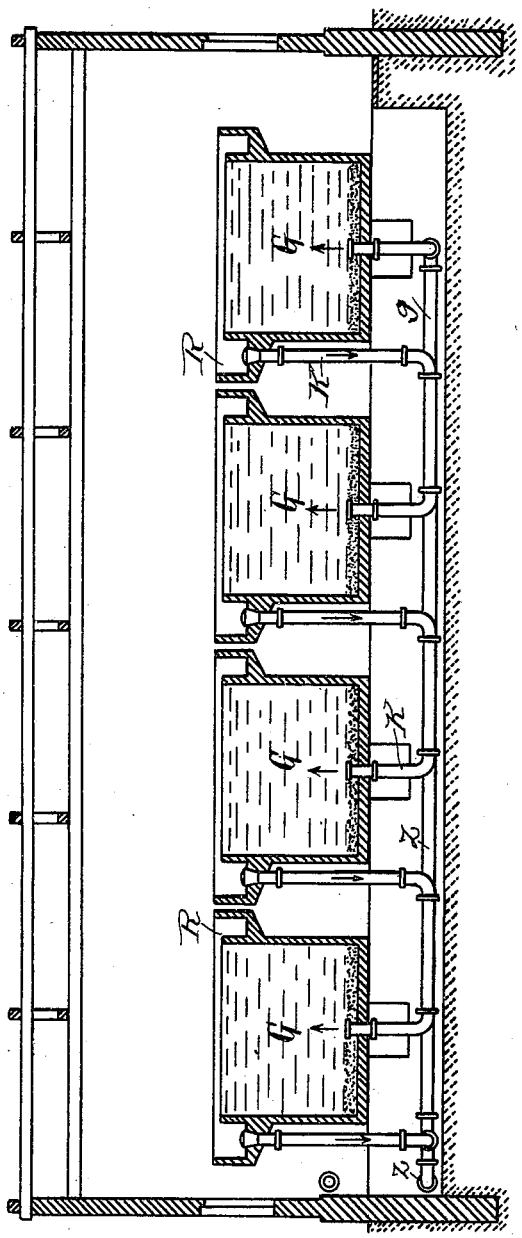
Witnesses:
Inventor:
August Heinhold
by Gustav V. Hopkins
Att'y.

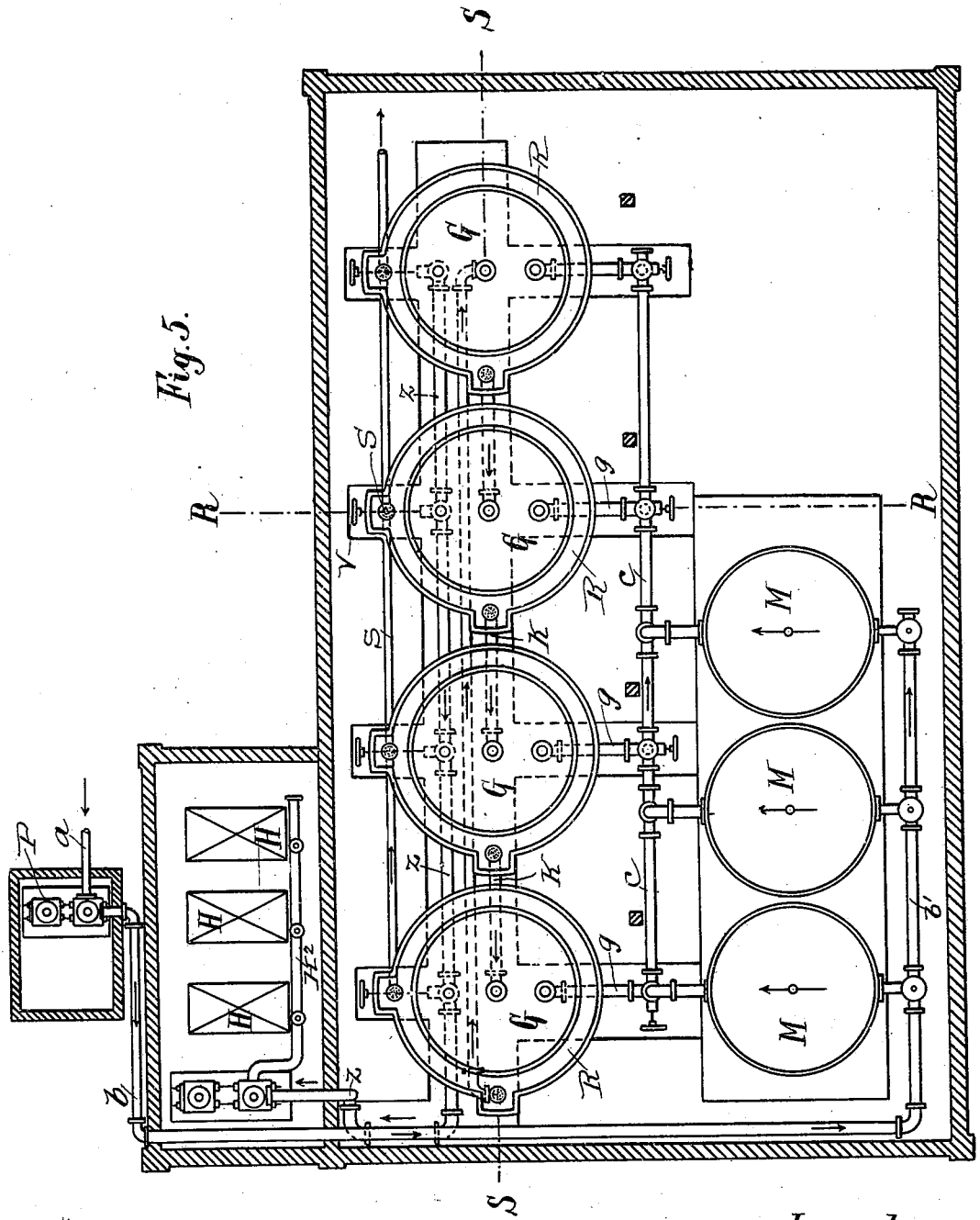

UNITED STATES PATENT OFFICE.

AUGUST HEINHOLD, OF WALLWITZ, GERMANY.

APPARATUS FOR PURIFYING SEWAGE.

SPECIFICATION forming part of Letters Patent No. 665,435, dated January 8, 1901.

Application filed April 17, 1899. Serial No. 713,397. (No model.)

*To all whom it may concern:*

Be it known that I, AUGUST HEINHOLD, a subject of the Emperor of Germany, residing at Wallwitz, near Halle-on-the-Saale, Germany, have invented an Improved Plant for Purifying Sewage, of which the following is a full, clear, and exact description.

The present invention consists of an improved plant for purifying sewage, as hereinafter set forth, and particularly pointed out in the claims.

In order to render the present specification more easily intelligible, reference is had to the accompanying drawings, in which similar letters of reference denote similar parts throughout the several views.

Figure 1 is a vertical section on line N N of Fig. 2, showing the clearing-tanks and the percolation area. Fig. 2 is a plan view of Fig. 1; Fig. 3, a vertical section on line R R of Fig. 5; Fig. 4, a longitudinal section on line S S of Fig. 5, and Fig. 5 a sectional plan of the plant for finally purifying the sewage.

The sewage from the various stations of the system is collected in a series of clearing-tanks B B, having a series of partition-walls B', with passages left at opposite ends, so as to cause the sewage to take a zigzag course through the said tank and in which the solid substances suspended in the sewage may set. From these tanks or ditches the water passes along pipe $B^2$ to the filtering-bed C, which may be of plowed land or meadow. This area is provided with a deep drainage-pipe system E, the various branches of which are embedded in sand or gravel in order to attain a better filter-bed and prevent the drains from getting stopped up. The drainage system E leads to a collecting-receptacle F and the water passes from the clearing-tanks B B to the percolating-surface C and then through drainage system E to the collecting-well F, from which it is conducted to purifying-tanks and treated with lime and aluminium salts, and finally to tanks in which the sediment is allowed to settle.

The water or sewage coming from the well F is conducted along pipe $a$ to the pump $p$, and thence along pipes $b$ $b'$ first to mixing-tanks M, in which it is mixed with the requisite chemicals by means of suitable stirrer mechanism M in the said tanks, as indicated in Fig. 3. The stirrer-arms M' may be rotated by means of bevel-gearing $M^4$, which may be driven by a belt $M^2$ from the power-shaft $M^3$. Three or more mixing-tanks with suitable pipe connections may be employed, so that one or the other may at any time be cut out for the purposes of cleaning or repairs. From the mixing-tanks the water passes through pipes $c$ $d$ $g$ to receptacles G, in which the sediment is allowed to deposit. The water enters the first of these receptacles at the bottom, and a part of the sediment contained in the same will be deposited in the first receptacle. Each of the receptacles G is provided with a gutter R, extending around its upper edge and from which a pipe K leads to the bottom of the next receptacle, and so on through the whole series. The interior edge of the gutter R is slightly lower than the outer rim, and the sewage rising in the tank G flows over the lower rim into the said gutter in a thin sheet, by which means it will be well aerated. The gutters are provided with outlet-pipes K, leading from the gutter of one tank to the bottom of the next, and each tank-gutter is also provided with an outlet-pipe S, having a valve V. Under normal circumstances the valves V of the first three tanks would be closed, so as to cause the water to pass through the pipe K to the next tank, and thus through all the tanks until it escapes at the pipe S of the last tank of the series. The outlets S of the other tanks are merely provided in case it should be necessary to cut out one or the other of the tanks for cleaning the same or repairs. The impurities and sediments deposited in the tanks may be removed by means of the scum-pump P, through the pipe $z$, and the liquid and sediment may then be passed by pipe $H^2$ through filters H H'.

The water coming from the tanks or receptacles G is perfectly clean and free from smell, and may either be used for industrial purposes or be allowed to flow off in any suitable manner. The cleansed water has, however, a slight alkaline reaction on account of the slight surplus of lime used to entirely eliminate the purifying organic substances. The water may be rendered perfectly neutral by the following process: The purified water is slightly acidulated with sulfuric acid, which will precipitate the surplus of lime as gypsum. The water may then be passed through a tank filled with small pieces of limestone (not shown) and the surplus of acid will be eliminated by the same, plaster or gypsum being formed. The water will then be perfectly neutral.

If it is required to render the settling down of the substances suspended in the sewage more rapid, the latter should be mixed with lime or salts of alumina, or both, before it enters the clearing-tanks. The precipitation caused by these reagents will carry down the other substances, owing to the great volume and high specific weight of the former, with more rapidity than they would settle of themselves.

I claim as my invention—

1. In a plant for treating sewage comprising collecting-tanks, a filter-bed with deep drainage system and a connecting-tank to the latter, the combination of a series of mixing-tanks provided with stirrer mechanism and pipe connections with means for cutting out any one member of the series, a series of settling-tanks G having an upper annular gutter with lower interior wall down which the liquid of the said tanks may flow in a thin sheet, means for conducting the deposits from the said tanks to a series of filtering-tanks substantially as described.

2. In a plant for treating sewage of the class specified the combination of a series of mixing-tanks for applying chemicals, into which the sewage from the filtering-bed is fed, a series of settling-tanks having upper annular gutters, formed around the walls of the same, the interior edge of the said gutters being slightly lower than the outer edge, and down the interior wall of which the liquid may flow in a thin sheet, means for conducting the liquid in the gutter of one settling-tank to the bottom of the next, and means for conducting the sediment in the bottom of the tanks of the series to filtering-tanks substantially as described.

In witness whereof I have hereunto set my hand in presence of two witnesses.

AUGUST HEINHOLD.

Witnesses:
HERM. SACK,
RUDOLPH FRICKE.